United States Patent
Kanuma et al.

(10) Patent No.: US 7,204,514 B2
(45) Date of Patent: Apr. 17, 2007

(54) AIRBAG FOR VEHICLE

(75) Inventors: Tadao Kanuma, Shizuoka (JP);
Yasuhiro Uchida, Shizuoka (JP)

(73) Assignee: Nihon Plast Co., Ltd., Shizuoka (JP)

( * ) Notice: Subject to any disclaimer, the term of this patent is extended or adjusted under 35 U.S.C. 154(b) by 118 days.

(21) Appl. No.: 10/642,181

(22) Filed: Aug. 18, 2003

(65) Prior Publication Data

US 2004/0036262 A1    Feb. 26, 2004

(30) Foreign Application Priority Data

Aug. 22, 2002    (JP)    ............... 2002-242723

(51) Int. Cl.
*B60R 21/16*    (2006.01)
(52) U.S. Cl. ................................ 280/743.1
(58) Field of Classification Search ................ 280/739, 280/743.1, 728.1
See application file for complete search history.

(56) References Cited

U.S. PATENT DOCUMENTS

| 5,350,188 | A |   | 9/1994  | Sato |              |
|-----------|---|---|---------|------|--------------|
| 5,560,649 | A | * | 10/1996 | Saderholm et al. | ...... 280/743.1 |
| 5,871,231 | A |   | 2/1999  | Richards et al. | |
| 5,909,895 | A | * | 6/1999  | Iino et al. | ................. 280/743.1 |
| 6,722,695 | B2| * | 4/2004  | Kobayashi et al. | ......... 280/739 |

FOREIGN PATENT DOCUMENTS

| EP | 0 739 784 A2 | 10/1996 |
| EP | 0 800 959 A2 | 10/1997 |
| JP | 6-298025 A   | 10/1994 |
| JP | 7-205738 A   | 8/1995  |
| JP | 8-156730 A   | 6/1996  |
| JP | 8-268214 A   | 10/1996 |
| JP | 2002-59803 A | 2/2002  |

OTHER PUBLICATIONS

Japanese Industrial Standards Commitee Divisional Council on Chemical/JIS K 6253 Hardness testing methods for rubber, vulcanized or thermoplastic.

* cited by examiner

*Primary Examiner*—Faye M. Fleming
(74) *Attorney, Agent, or Firm*—Sughrue Mion, PLLC

(57) ABSTRACT

An airbag for a vehicle which is comprised of a first base cloth portion having a gas inlet opening, a second base cloth portion joined along an outer edge thereof to an outer edge of the first base cloth portion to form a gas-fillable chamber, gas escape venting which is communicable with the chamber, and a shielding connection portion. The shielding connection portion separably joins the first base cloth portion and second base cloth portion, and is formed at least at a portion of a periphery of the gas escape venting which is closest to the gas inlet opening.

19 Claims, 9 Drawing Sheets

AIRBAG FOR VEHICLE

BACKGROUND OF THE INVENTION

The present invention relates to an airbag which functions to protect passengers in a vehicle during a collision.

Airbags have become widely used as safety devices to protect passengers traveling in a vehicle. Besides airbags designed for safety of the driver, specific locations inside a vehicle where airbags are installed have also increased to include airbags designed for safety of passengers, for protection in case of side collisions, as well as rear-seat airbags.

As the number of airbags present as well as the specific installation points in a vehicle increase, so does the need for airbag devices which are lighter and smaller. In response, inflators, which are the heaviest component of an airbag device, have been designed which are smaller and lighter, and which use less chemical agent or gas than previously. However, with a decreased amount of chemical agent or gas, there is an accompanying decreased amount of gas that can be used to inflate an airbag. And usually, there are one or more round vent holes in an airbag by which gas exits, and gas prematurely escapes an airbag by the vent holes even during the initial inflation stage of an airbag. In order to make optimal use of the limited amount of gas available, airbags have been designed where the vent holes are at first sealed, and open to let gas escape when the pressure inside the airbag has increased to a certain level.

Japanese Patent Provisional Application (Heisei) 8-268214 discloses an airbag which has a reinforcing sheet having a C-shaped cut about an outer circumference of a vent hole which the reinforcing sheet covers. Japanese Patent Provisional Application (Heisei) 7-205738 discloses an airbag having an area around a vent hole being brought together by folding and held together by stitching, the stitching being torn apart by pressure inside the airbag reaching a certain level. Japanese Patent Provisional Application 2002-59803 discloses an airbag having slit-shaped vent holes which are covered with an adhesive agent, the vent holes becoming opened once a predetermined internal pressure has been reached inside the airbag. Therefore, the airbags disclosed in these documents are able to make effective use of gas provided by an inflator by maintaining vent holes in a sealed or closed state during the initial inflation stage.

Also, in order to regulate the projection distance that an airbag inflates toward a passenger and realize desirable inflation characteristics, there are airbags which employ various means to regulate the inflation shape of an airbag, for example, a tether or strap. Japanese Patent Provisional Application (Heisei) 6-298025 discloses a driver's airbag having a front panel and a rear panel which are held together by an adhesive agent, the adhesive agent being melted by the heat of gas filling the bag to allow final inflation of the airbag. Japanese Patent Provisional Application (Heisei) 8-156730 discloses an airbag which has inflator side material and occupant side material held together by stitching which breaks apart once the internal pressure of the airbag has reached a certain level.

SUMMARY OF THE INVENTION

However, airbags such as those given above according to the related art must be designed to make full use of gas injected by an inflator, as well as to allow inflation characteristics to be regulated as desired. As a result, manufacture of airbags becomes more complicated, and a rise in cost is incurred.

It is therefore an object of the present invention to provide an airbag for a vehicle which is capable of making full use of gas injected by an inflator as well as allowing inflation characteristics to be regulated as desired, and that is cost-effective to manufacture.

An aspect of the present invention resides in an airbag for a vehicle, the airbag comprising a first base cloth portion having a gas inlet opening, a second base cloth portion joined along an outer edge thereof to an outer edge of the first base cloth portion to form a chamber which is fillable with gas, a gas escape venting which is communicable with the chamber, and a shielding connection portion which separably joins the first base cloth portion and second base cloth portion, the shielding connection being formed at least at a portion of a periphery of the gas escape venting which is closest to the gas inlet opening.

Another aspect of the present invention resides in an airbag for a vehicle, the airbag comprising a first base cloth portion having a gas inlet opening, a second base cloth portion joined along an outer edge thereof to an outer edge of the first base cloth portion to form a chamber which is fillable with gas, gas escape means which is communicable with the chamber, and joining means for adhesively joining the first base cloth portion and second base cloth portion and also for shielding at least a portion of the gas escape means in the direction of the gas inlet opening, the first base cloth portion and the second base cloth portion separating when pressure inside the chamber rises beyond a predetermined value.

A further aspect of the present invention resides in an airbag for a vehicle, the airbag comprising a first cloth portion, the first cloth portion comprising a gas inlet opening and a gas escape venting, the venting comprising one or more holes communicable with the chamber, a second cloth portion joined to the first cloth portion along an outer periphery thereof, a chamber which is fillable with gas being formed thereby, a connection portion which joins the first cloth portion and the second cloth portion temporarily, the first cloth portion and second cloth portion separating during inflation, the adhesive connection portion comprising a first adhesive portion which is formed at least at a portion of a periphery of the gas escape venting which faces the gas inlet opening, and a second adhesive portion which is formed at a position substantially opposite the first adhesive portion centered around the gas inlet opening.

DETAILED DESCRIPTION OF THE INVENTION

Figure 1:
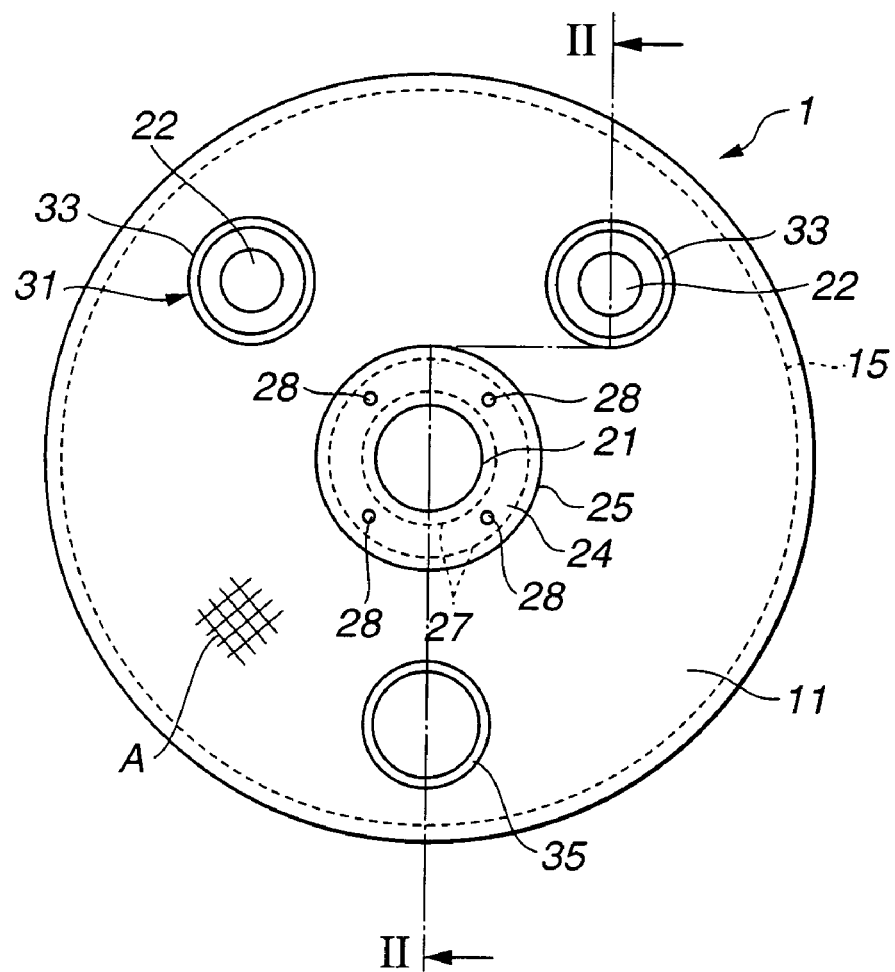
FIG. 1 is a top view of a first base cloth portion of an embodiment of an airbag according to the present invention.
Figure 2:
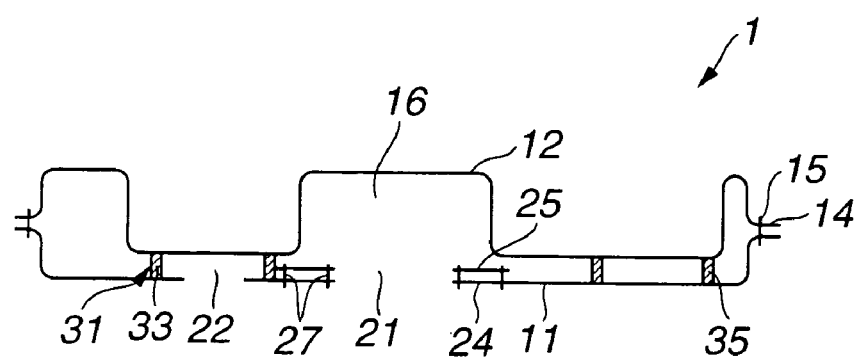
FIG. 2 is a cross-section diagram of the airbag of FIG. 1 showing a side view taken along the line II—II.

Referring to FIGS. 1 to 13, there is discussed an embodiment of an airbag in accordance with the present invention.

Referring to FIGS. 1 to 4, an airbag apparatus 2, which comprises an airbag 1, is mounted on a boss portion of a vehicle steering wheel (not shown) such that it can protect a passenger in case of a collision. Further, a vehicle steering wheel is mounted on an inclined steering shaft and thus used in an inclined state. In the explanation that follows, the direction in which an airbag will expand toward a driver or passenger will be referred to as the front side, and the direction opposite this will be referred to as the back side.

Airbag apparatus 2 comprises a baseplate 3 as a support member, airbag 1 which is attached to baseplate 3, an inflator 4 which injects gas into airbag 1, as well as a retainer and cover which are not shown.

Airbag 1 comprises a first base cloth portion 11 and a second base cloth portion 12, which are joined at respective outer peripheries of which to form an outer periphery 14. First base cloth portion 11 and second base cloth portion 12 are joined at outer periphery 14 by an outer periphery joining portion 15, which is stitching. Airbag 1 is thus formed as a bag comprising a chamber 16 which is fillable with gas. First base cloth portion 11 and second base cloth portion 12 are formed by cutting a circular piece of fabric made of nylon fiber. Further, a gas inlet opening 21, which is round, is formed in a center of first base cloth portion 11, and a gas escape venting 22, 22 which comprises two holes in the embodiment, is formed in first base cloth portion 11 between gas inlet opening 21 and outer periphery 14. An attaching member 24 is disposed around gas inlet opening 21, and fixes airbag 1 to base plate 3. A reinforcing member 25, which is ring-shaped and existing either singly or in a plurality, is layered on attaching member 24 and joined by attaching-member joining portion 27, which is stitching. A plurality of attaching holes 28 are formed around gas inlet opening 21. Although not shown, ring-shaped reinforcing members are also layered around each hole of gas escape venting 22, 22, and joined by an attaching-member joining portion such as stitching. The direction of the grain of the fabric of first base cloth portion 11 is indicated by reference letter A in FIG. 1.

Further, a connection portion 31 is disposed on airbag 1 at a position which is distanced from gas inlet opening 21. Connection portion 31 is a so-called temporary bonding which serves to bond first base cloth portion 11 and second base cloth portion 12 so that first base cloth portion 11 and second base cloth portion 12 are separable. Connection portion 31 comprises a shielding connection portion 33, 33 which in the embodiment comprises two ring-shaped portions each of which are disposed respectively around each hole of gas escape venting 22, 22, and an auxiliary connection portion 35 which is disposed at one location at a distance from shielding connection portion 33, 33. Connection portion 31 is formed using a hardening adhesive, and tears when a predetermined amount of pressure is applied to separate first base cloth portion 11 and second base cloth portion 12.

Airbag apparatus 2 is composed in the following manner. Attaching member 24 of airbag 1 and a flange portion 5 of inflator 4 are disposed and held between the retainer (not shown) disposed inside airbag 1 and baseplate 3, bolts projectingly formed on the retainer project through attaching holes 28 of airbag 1, and further, project through attaching holes formed in flange portion 5 of inflator 4 and baseplate 3, and held in place by a nut, such that airbag 1 is attached to base plate 3. Then, with airbag 1 in a compactly folded state, a cover is fitted over airbag 1 and fixed to baseplate 3.

If a vehicle equipped with airbag apparatus 2 receives the impact of a collision, inflator 4 is activated by a control unit, and gas is injected from inflator 4 into chamber 16 of airbag 1.

Figure 3:
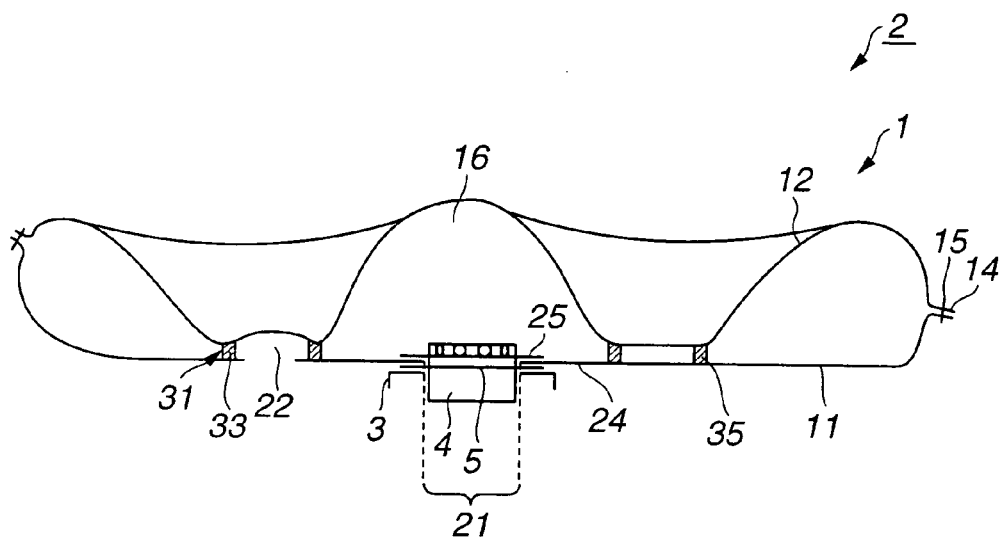
FIG. 3 is a cross-sectional diagram of the airbag of FIG. 2 showing the side view taken along the line II—II during inflation.

At which time, during the initial inflation stage, as shown in FIG. 3, since connection portion 31, that is, shielding connection portion 33, 33 and auxiliary connection portion 35, connects first base cloth portion 11 and second base cloth portion 12, a projection distance on the front side of airbag 1 is controlled, i.e., the distance airbag 1 inflates toward a passenger. And also during the initial inflation stage, since second base cloth portion 12 maintains gas escape venting 22, 22 in a closed off state with shielding connection portion 33, 33, there is a rapid supply of gas to outer periphery 14 without premature leakage of gas, and airbag 1, having a small volume, inflates rapidly and in a flat and even manner.

Figure 4:
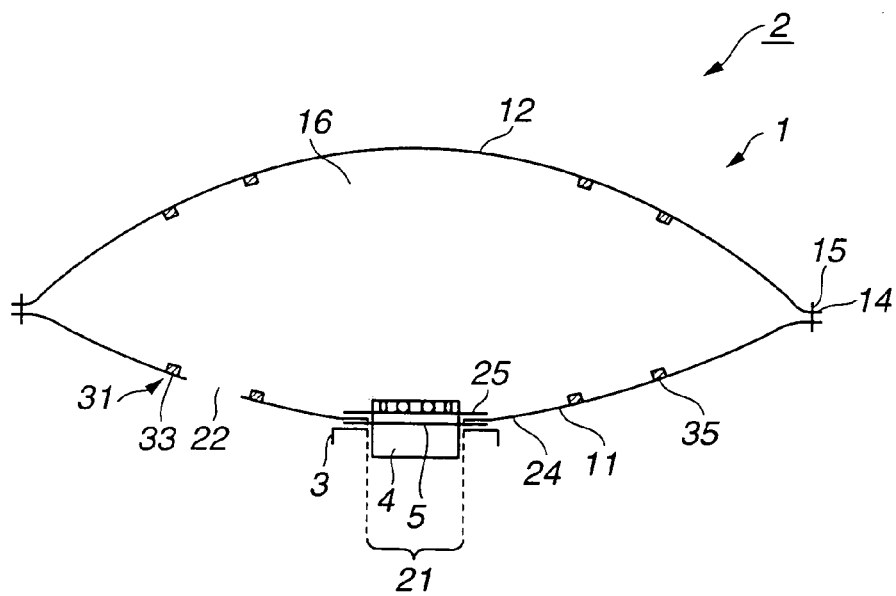
FIG. 4 is a cross-sectional diagram of the airbag of FIG. 3 showing the side view taken along the line II—II during inflation.

Next, as gas is supplied and the pressure inside chamber 16 of airbag 1 rises beyond a predetermined value, connection portion 31 tears, that is, shielding connection portion 33, 33 and auxiliary connection portion 35 peel or strip. The volume of chamber 16 then continues to increase, the surface of airbag 1 which contacts with a passenger becomes larger, and as shown in FIG. 4, airbag 1 eventually inflates to a maximum volume. Further, with shielding connection portion 33, 33 in a torn condition, gas escape venting 22, 22 is in a fully open state of communicating directly with chamber 16, such that rapid evacuation of gas from chamber 16 is facilitated at the moment a passenger contacts airbag 1.

Thus, according to the embodiment of the present invention, gas supplied by inflator 4 is used effectively in expansion of airbag 1, and the projection distance of airbag 1 during the initial inflation stage is controlled such that the inflation characteristics of airbag 1 are regulated and airbag 1 can be provided easily and at less expense. That is, without a complicated assembly such as one incorporating a tether or strap to regulate the inflation shape, two effects are realized, one which is making efficient use of gas and another which is regulating inflation characteristics by means of adhesive, i.e., shielding connection portion 33, 33 which is applied as an adhesive agent. Composition of the airbag as well as the manufacturing process can therefore be simplified, resulting in lowered manufacturing costs. Moreover, auxiliary connection portion 35, which is used in regulation of inflation characteristics of airbag 1, is formed with adhesive at the same time as shielding connection portion 33, 33, as an additional way to lower manufacturing costs.

Also, since gas is used efficiently, a small-volume inflator is used for inflator 4, and airbag apparatus 2 can be produced with a more compact design.

Further, with the embodiment, shielding connection portion 33, 33 is formed in a ring shape similar to gas escape venting 22, 22 in order to make gas escape venting 22, 22 gastight. However, shielding connection portion 33, 33 is not limited to this particular shape. The adhesiveness, which includes the shape of shielding connection portion 33, 33, can be decided based on such criteria as the particular specifications of the main base cloth which is the material to be bonded, the condition of the surface of the main base cloth, the area covered by the applied adhesive agent, or the specifications, volume, or inflator capability of the airbag. That is, besides being formed in a shape similar to gas escape venting 22, 22, any shape which will form a ring to make gas escape venting 22, 22 gastight is formable as a modification of the embodiment according to the present invention, i.e., square, polygonal, elliptical, oval, or a composite shape formed from a combination of any of these. In a modification of the embodiment according to the present invention, adhesive agent is applied in a thin line in a spiral shape around each hole of gas escape venting 22, 22, each hole normally being round, to form each ring-shaped portion of shielding connection portion 33, 33. Adhesive agent may be applied in a circle which is from 1.2 to 3 times a diameter of either hole of gas escape venting 22, 22, and may be applied with a thickness of from 0.05 to 0.5 mm.

Further, in another modification of the embodiment according to the present invention, a tear start portion is formed in each ring-shaped portion of shielding connection portion 33, 33 by changing the shape or by changing the adhesiveness of each ring-shaped portion, such that the bonding strength is increased in the direction of gas inlet opening 21, i.e., in the direction from which gas is entering airbag 1, and to lower the bonding strength in the opposite direction, i.e., in the direction opposite from the direction from which gas is entering. Therefore, with this modification, adhesiveness is maintained to withstand the initial thrust of gas, and peeling is started from the tear start portions which are disposed to face an outer periphery of airbag 1 so as to allow second base cloth portion 12 to smoothly separate from first base cloth portion 11. In this manner, gas is used effectively, and a smooth transition from a flat and even inflation shape to an inflation shape of maximum volume is achieved.

Figure 5:
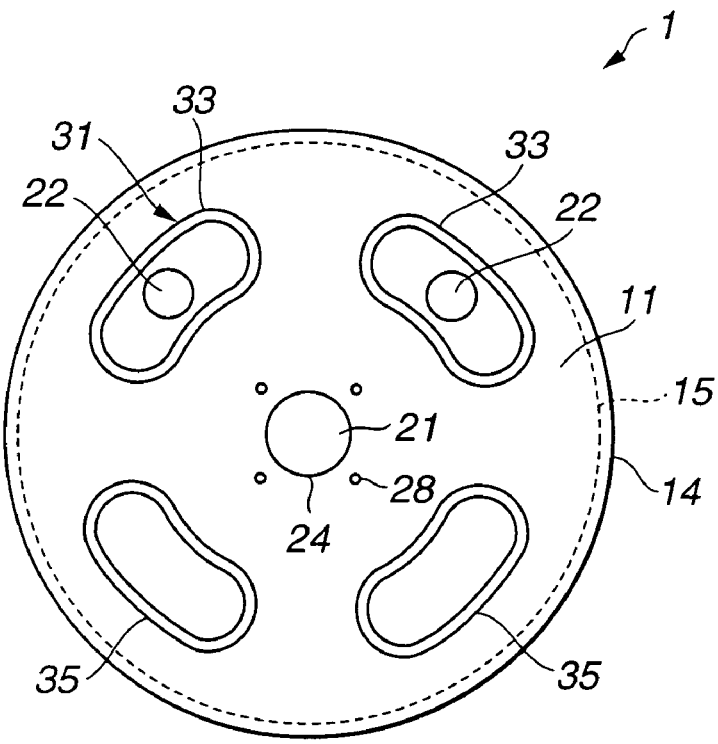
FIG. 5 is a top view of a first base cloth portion of a modification of the airbag according to the present invention.

Thus, in a modification of the embodiment of the present invention as shown in FIG. 5, shielding connection portion 33, 33 is disposed in two locations in a circle having gas inlet opening 21 as a center, each ring-shaped portion of which being formed substantially in a bent elliptical shape resembling a caterpillar. Also, in this modification, auxiliary connection portion 35, 35 is formed in two locations and is shaped similarly to shielding connection portion 33, 33. That is, auxiliary connection portion 35, 35 is formed as two rings, each being in a bent elliptical shape. Shielding connection portion 33, 33 and auxiliary connection portion 35, 35 are disposed in a circumferential direction about a circumference of gas inlet opening 21 at equal intervals. Other than the bent elliptical shape of each ring-shaped portion and the formation of auxiliary connection portion 35, 35 in two locations, this modification is the same as the embodiment.

Figure 6:
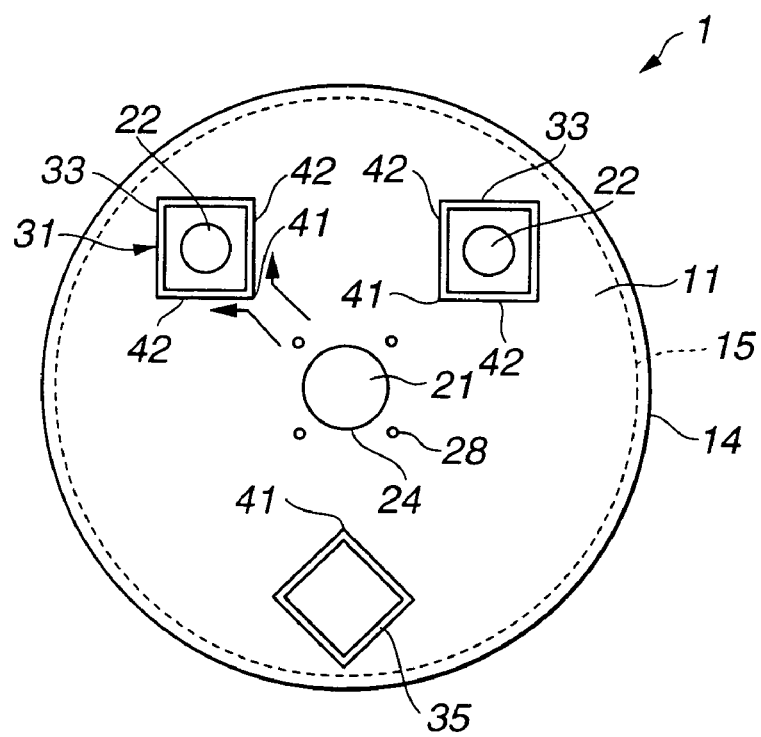
FIG. 6 is a top view of a first base cloth portion of another modification of the airbag according to the present invention.

And thus, in another modification of the embodiment according to the present invention as shown in FIG. 6, each ring-shaped portion of shielding connection portion 33, 33 respectively comprises a corner portion 41 which is formed to face gas inlet opening 21, and guide portions 42 and 42 which are formed to extend from corner portion 41, such that each ring-shaped portion of shielding connection portion 33, 33 is formed in a so-called pointed steeple-shaped form, a point of which faces gas inlet opening 21. That is, corner portion 41 faces or points toward gas inlet opening 21.

As shown in FIG. 6, each ring-shaped portion of connection portion 31, that is, shielding connection portion 33, 33 and auxiliary connection portion 35, is a quadrangular shape having a single corner portion 41 which faces gas inlet opening 21, i.e., in the direction of a gas flow G provided by inflator 4. Therefore, with this modification, two sides of connection portion 31 constitute guide portions 42 and 42, and adhesiveness is maintained to withstand the initial thrust of gas entering airbag 1 without increasing the bonding strength more than necessary. Other than the formation of each ring-shaped portion in a quadrangular shape, this modification is the same as the embodiment.

A further modification of the embodiment according to the present invention will now be explained. Gas escape venting 22, 22 is originally in a closed state, and shielding connection portion 33, 33 is formed respectively at a portion of a periphery of each hole of gas escape venting 22, 22 which faces gas inlet opening 21. That is, shielding connection portion 33, 33 is formed between each hole of gas escape venting 22, 22 and gas inlet opening 21, such that first base cloth portion 11 and second base cloth portion 12 are not bonded together at a portion of the periphery of gas escape venting 22, 22, therefore leaving gas escape venting 22, 22 in communication with chamber 16. That is, first base cloth portion 11 and second base cloth portion 12 are not bonded at a portion of gas escape venting 22, 22 which is facing away from the direction from which gas is being introduced through gas inlet opening 21, and gas escape venting 22, 22 communicates with chamber 16 through this unbonded portion, as shown in FIG. 7.

In this modification, shielding connection portion 33, 33 is formed in a plurality of arcuate-shaped portions, each of which shields a half of an edge portion of each hole of gas escape venting 22, 22 which faces gas inlet opening 21, and each arcuate-shaped portion respectively comprises an opposing connection portion 51 which faces gas inlet opening 21, as well as a pair of connection-portion end portions 52 and 52, each of which respectively extend from an end of opposing connection portion 51 toward outer periphery 14. A tip end portion of each of connection-portion end portions 52 and 52 which faces outer periphery 14 serves as tear start portions 54 and 54. Other than shielding connection portion 33, 33 being formed in a plurality of arcuate-shaped portions with tear start portions 54, 54 formed therein, this modification is the same as the embodiment.

Figure 8:
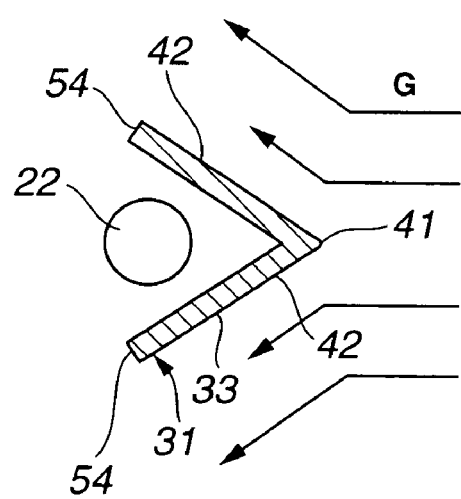
FIG. 8 is a portional top view of a first base cloth portion of another further modification of the airbag according to the present invention.

A further modification of the embodiment according to the present invention will now be explained. As shown in FIG. 8, shielding connection portion 33, 33 is formed in a plurality of V-shaped portions, each of which comprises corner portion 41 disposed to face gas inlet opening 21, i.e., the direction from which gas provided by inflator 4 flows, and guide portions 42 and 42 formed to extend from corner portion 41, such that each V-shaped portion of shielding connection portion 33, 33 is formed in a so-called pointed steeple-shaped form, a point of which faces gas inlet opening 21. That is, corner portion 41 points or faces toward gas inlet opening 21. Tear start portions 54 and 54 are formed in a tip end portion of each of guide portions 42 and 42 similarly to the previous modification. Other than shielding connection portion 33, 33 being formed in a plurality of V-shaped portions and tear start portions 54 and 54 formed therein, this modification is the same as the embodiment.

Figure 7:
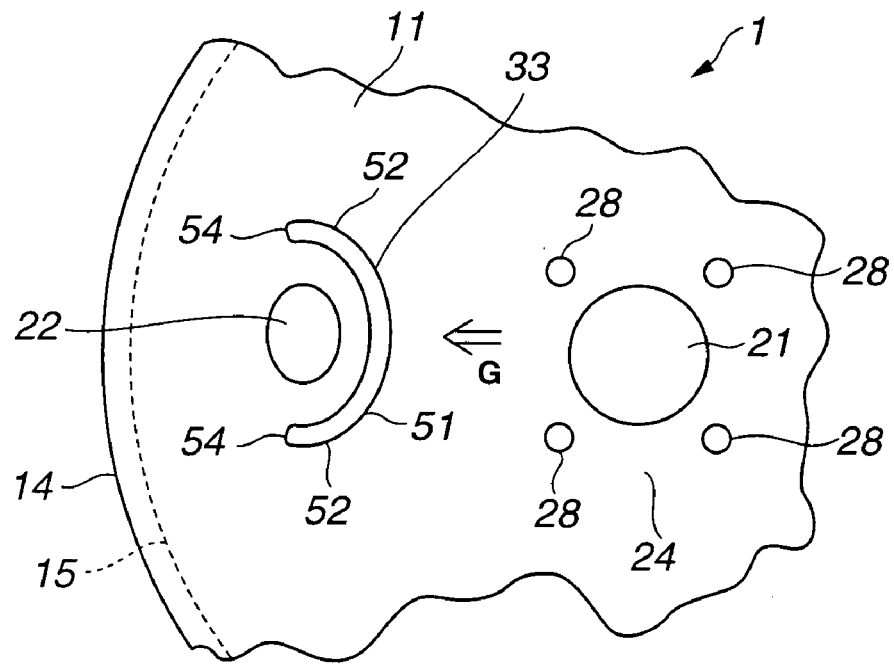
FIG. 7 is a portional top view of a first base cloth portion of a further modification of the airbag according to the present invention.
Figure 9:
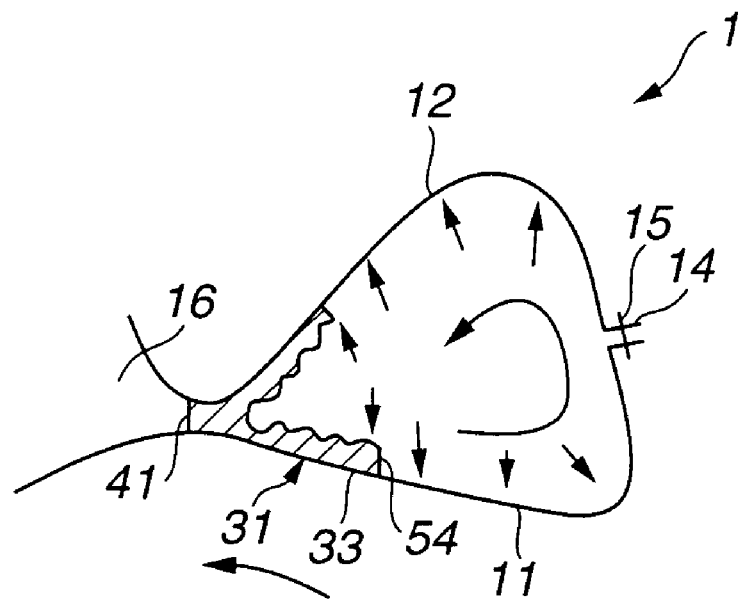
FIG. 9 is a cross-sectional diagram of the airbag of FIG. 8 during inflation.

Thus, in these two modifications shown in FIGS. 7 and 8 respectively, by disposing shielding connection portion 33, 33 so as to shield at least a half of the edge portion of each hole of gas escape venting 22, 22 which faces gas inlet opening 21, gas reaches outer periphery 14 of chamber 16 of airbag 1 once it has been supplied, as shown in FIG. 9, such that airbag 1 inflates rapidly as well as flatly and evenly. Further, since the tip end portions which face outer periphery 14 serve as tear start portions 54 and 54, shielding connection portion 33, 33 is able to tear or peel smoothly starting first from the direction of the outer periphery.

A still further modification of the embodiment according to the present invention will now be explained. In this modification, joining portions of airbag 1 according to the previously described modifications other than connection portion 31, i.e., other than shielding connection portion 33, 33 and auxiliary connection portion 35, are formed from the same adhesive agent as connection portion 31 instead of being sewn. Manufacture is therefore simplified and costs lowered.

Figure 10:
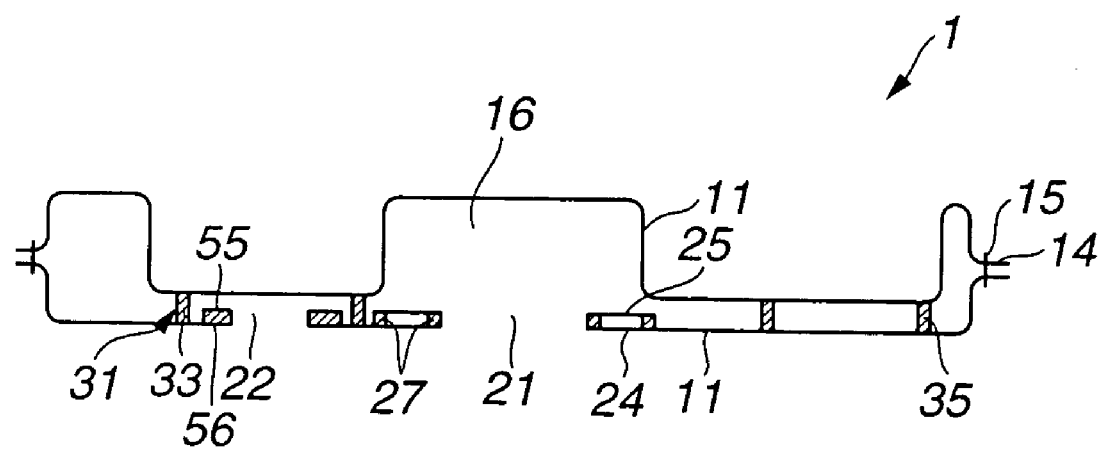
FIG. 10 is a cross-sectional diagram of a first base cloth portion of a still further modification of the airbag according to the present invention.

Referring to FIG. 10, attaching-member joining portion 27 of reinforcing member 25 of attaching member 24 is formed with an adhesive agent, and attaching-member joining portion 56 of reinforcing cloth 55 of each hole of gas escape venting 22, 22 is formed with an adhesive agent. Other than the attaching-member joining portions being formed with an adhesive agent, this modification is the same as the embodiment.

Auxiliary connection portion 35 is disposed on a side of gas inlet opening 21 opposite to shielding connection portion 33, 33 formed either singly or in a plurality thereof, such that airbag 1 easily inflates with a symmetrically balanced shape. In the embodiment according to the present invention, referring to FIG. 1, shielding connection portion 33, 33 is formed in two locations and auxiliary connection portion 35 is disposed on a side of gas inlet opening 21 opposite to shielding connection portion 33, 33. Auxiliary connection portion 35 is also disposed at a position which is opposite to a point between and equidistant from both ring-shaped portions of shielding connection portion 33, 33. In a modification of the embodiment according to the present invention as shown in FIG. 5, auxiliary connection portion 35 is disposed in two locations in rotation symmetry with shielding connection portion 33, 33 which is disposed in two locations, centered around gas inlet opening 21. Other than auxiliary connection portion 35 being formed at two locations and in rotation symmetry with shielding connection portion 33, 33, this modification is the same as the embodiment.

Figure 11:
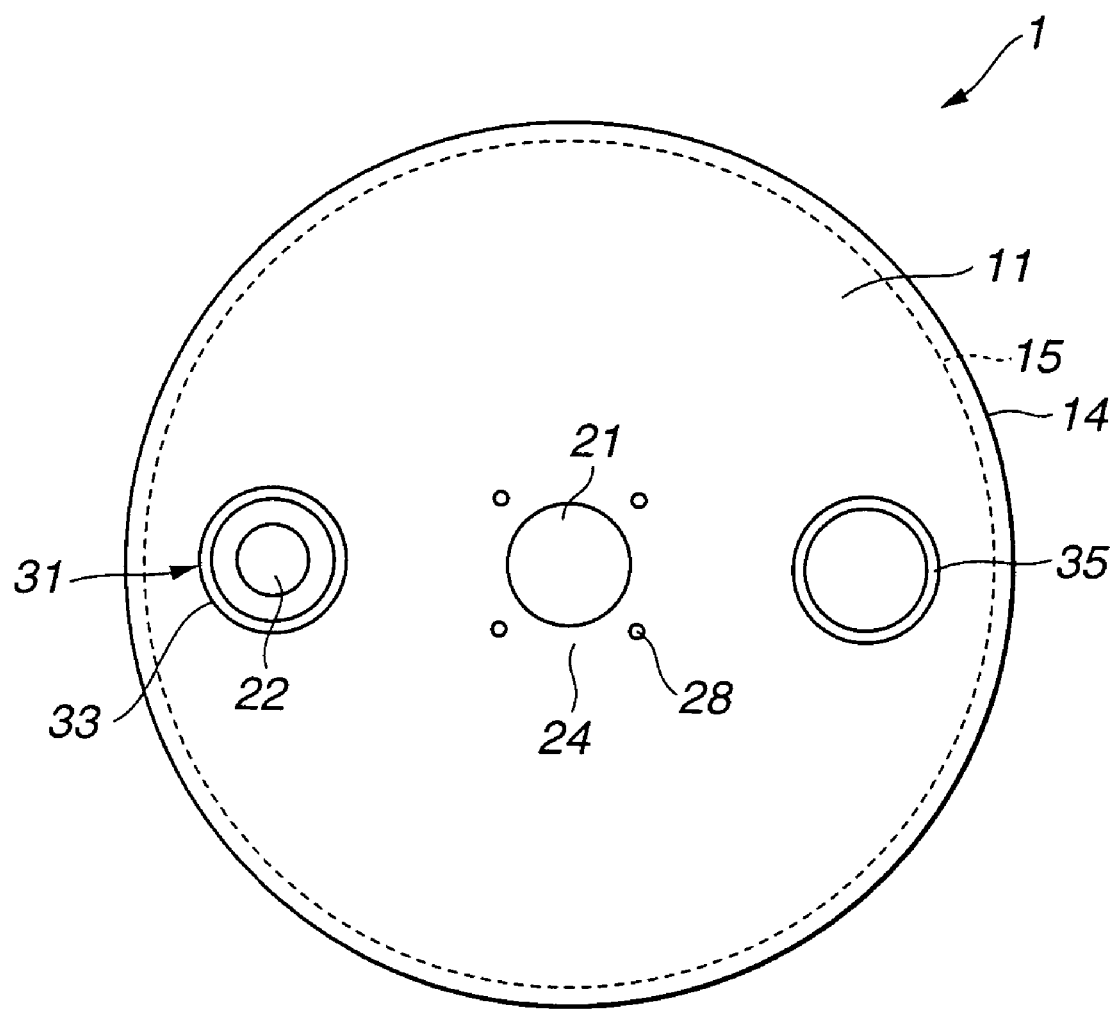
FIG. 11 is a top view of a first base cloth portion of another further modification of the airbag according to the present invention.

In another modification of the embodiment of the present invention shown in FIG. 11, auxiliary connection portion 35 is disposed in one location in rotation symmetry to shielding connection portion 33 formed in one location, centered around gas inlet opening 21. Thus, shielding connection portion 33, 33 as well as auxiliary connection portion 35, which temporarily bond first base cloth portion 11 and second base cloth portion 12, are disposed in rotation symmetry to one another centered around gas inlet opening 21, such that airbag 1 is stabilized and will inflate with disregard for a degree to which a steering wheel has been rotated. Other than shielding connection portion 33 being formed in one location and auxiliary connection portion 35 being formed in rotation symmetry therewith, this modification is the same as the embodiment. As shown with the embodiment and modifications thereof, it is preferable to temporarily bond first base cloth portion 11 and second base cloth portion 12, which constitute the main base cloth, by forming auxiliary connection portion 35 in a substantially symmetrical position centered around gas inlet opening 21 opposite to gas escape venting 22, 22 at the same time as forming shielding connection portion 33, 33, in order to execute inflation and expansion uniformly. The application of adhesive agent in this instance, that is, the application surface area, application thickness, and other conditions may be set to be the same as that of around gas escape venting 22, 22, or it may be set differently. As explained with reference to the embodiment and two modifications thereof, first base cloth portion 11 and second base cloth portion 12 are temporarily bonded at locations other than gas escape venting 22, 22 by auxiliary connection portion 35 formed in a single location or in several locations.

Also, it is necessary that adhesive agent for forming shielding connection portion 33, 33 as well as other joined portions be a hardening adhesive agent, so that adhesiveness is maintained which is superior in stability and durability. In an instance where the adhesive agent is a plastic or unhardening adhesive agent, it is difficult to stabilize the adhesiveness of shielding connection portion 33, 33, owing to factors such as softening due to a rise in temperature inside a vehicle and hot gas from inflator 4, or to a slow and gradual flow of the agent from being in a compactly folded state for an extended period of time. It therefore becomes necessary to develop a special adhesive agent, which in turn leads to an increase in manufacturing cost. In this respect, adhesive agent used in the present invention may be a hardening adhesive agent such as thermosetting, cold setting, or moisture setting types.

The method of applying hardening adhesive agent at predetermined locations on first base cloth portion 11 and second base cloth portion 12 may be appropriately selected, for example, by a trowel or roller, nozzle application such as by an air gun, screen application, or as may be necessary, by application in the form of a sheet. However, the method is not limited to these examples.

Also, since hardening adhesive agent for forming portions such as shielding connection portion 33, 33 is applied in a plurality of locations of airbag 1, it is preferable that the adhesive agent have a relatively soft hardness after hardening. That is, it is preferable that the hardness of shielding connection portion 33, 33 and other portions after hardening be at or under a rating of 25 according to the JIS-A scale. If the hardness after hardening is at a rating greater than 25, locations where the adhesive agent has been applied will become hard and inflexible, possibly making it difficult for airbag 1 to be folded and compactly stored in a ready state.

Further, it is necessary to maintain temporary bonding over an extended period of time, and the hardening adhesive agent may be selected based on the desired temporary bonding strength, i.e., peeling strength, for example, silicone, nitrile, chloroprene, fluorocarbon, polyurethane, Hypalon, polyolefin, and other rubber adhesive agents, epoxy, phenolic, urea, melamine, acrylic, polyurethane, and other resin adhesive agents, urethane and other reactive hot-melt resins, etc. are available. A mix of these, or a modified form of these may be used, and as needed, thermoplastic material may be partially used in combination.

Also, in an instance where reinforcing cloth which is disposed around each hole of gas escape venting 22, 22 is joined to first base cloth portion 11, it is preferable for shielding connection portion 33, 33 to be formed at an area which is outside the reinforcing cloth of gas escape venting 22, 22, and directly and temporarily bond first base cloth portion 11 and second base cloth portion 12 which constitute the main base cloth. That is, in an instance where first base cloth portion 11 and second base cloth portion 12 are comprised of a thin base cloth woven from fine thread, by disposing reinforcing cloth around gas escape venting 22, 22, damage which occurs in the main base cloth due to force applied to an outer periphery of gas escape venting 22, 22 by shock of peeling is decreased. Accordingly, it is preferable that a peeling effect of adhesive agent does not occur at a reinforcing portion, and application of adhesive agent is best applied at an area outside the reinforcing cloth, for example, at an area which is from 1.2 to 2 times a diameter of the reinforcing cloth. Further, joining of reinforcing cloth to gas escape vents 22 and 22 may be performed by one of various methods including sewing, bonding, or melting.

Also, for first base cloth portion 11 and second base cloth portion 12 which constitute the main base cloth of airbag 1, it is preferable to use cloth which uses fine thread of 350 dtex (decitex) or less (=315 deniers) and whose weight is 200 g/m² or less. That is, by using fine thread which is 350 dtex or less, airbag 1 is designed so that it is lightweight and able to be compactly folded. Also, by using cloth whose weight is 200 g/m² or less, airbag 1 can be designed to be lightweight. Further, it is preferable to use cloth having a cover factor (CF) is 800 or over. Cover factor is an index of how finely and closely woven the fabric of a cloth is, and is derived from a thickness of thread (decitex) constituting the cloth and a woven density of the cloth (filaments/cm). In an instance where the cover factor is less than 800, the texture of the cloth becomes coarse, and thus when airbag 1 inflates in a burst, tearing can easily occur in the cloth, especially in base cloth around gas escape venting 22, 22. However, in an instance where the cover factor is greater than 1040, cloth is extremely coarse and hard, and it is difficult to make a folded volume of airbag 1 small, that is, the space which airbag 1 takes up when in a folded state for storage.

The cover factor (CF) of a cloth, more specifically, is derived from the thickness in decitex of lengthwise threads and breadthwise threads (Dw and Df) used in a cloth, and the lengthwise woven density and breadthwise woven density (Nw and Nf) (filaments/cm) of a cloth.

Cover factor is mathematically expressed by the following equation: $CF=\sqrt{Dw} \times Nw + \sqrt{Df} \times Nf$. Also, for the main base cloth, it is possible to use a non-coated base cloth, Or, it is possible to use a coated base cloth coated at least on side thereof as in conventional airbags, in order to provide hermeticity, heat resistance, or other desirable characteristics. Thus, in an instance of a non-coated base cloth, by using a base cloth having a low degree of air permeability, for example, 0.5 cc/cm²/sec or less according to the Frazil method (JIS L-1096 8. 27. 1A method), the amount of gas escaping airbag 1 through the base cloth is decreased. Also, as coating material, material which is usable in an airbag can be appropriately selected to be superior in heat resistance and durability, such as silicone resin or rubber, fluorocarbon resin or rubber, chloro resin or rubber, polyurethane resin or rubber (including fluorocarbon or silicone modified types), epoxy resin, polyester resin or rubber, polyamide resin, polyimide resin, polyolefin resin or rubber, chlorosulfonated resin or rubber, phenol resin, or acrylic resin. Coating material may employ any one of these singly or in a mixture of two or more, or in a copolymer. These coating materials may be solvent, non-solvent, aqueous dispersion, water-soluble, or, if required, solid type coating material may be employed. Also, the amount of coating material used on first base cloth portion 11 and second base cloth portion 12 can be selected based on various factors including hermiticity and heat resistance, for example, it may have a weight of from 10 to 100 g/m² (weight of dry coating).

Further, the method for applying coating material to the base cloths can be chosen based ability to maintain bonding with the cloth and hermeticity of the coating layer, and it is possible to use any of various methods, including coating (knife coating, kiss, reverse, comma), printing (screen, roller coating, rotary), immersion coating, spraying, laminating. Also, in order to promote adhesion between the cloth and the coating material, physical and chemical pre-treatment can be performed, for example, application of a primer, or plasma etching of the cloth surface or the main base cloth surface. Further, after the coating material has been applied to the cloth, contact or non-contact heat treatment, or high-energy treatment (high-frequency, electron-beam, ultraviolet) may be performed as part of the drying and hardening process, in order to improve the physical characteristics of coating material and adhesion between the cloth and the coating material. Also, in the embodiments of the present invention, any additive normally used for improving processing, adhesion, surface characteristics, or durability may be used in the coating material used, for example, cross-linking agent, coupling agent, accelerating agent, retardant, adhesive agent, heat resistance agent, antioxidant, light resistance agent, anti-aging agent, lubricant, lubricating agent, anti-tack agent, pigment, water repellent agent, oil repellent agent, masking agent such as titanium oxide, brightening agent, flame retardant, or plasticizer. The coating material may employ a single one of these, or a mixture of two or more of these.

The fiber constituting the cloth is not limited in particular. The fiber can be selected from, for example, nylon 6, nylon 6,6, nylon 4,6, nylon 6,10, nylon 6,12, etc. either singly or in a copolymer or mixture to obtain an aliphatic polyamide fiber, nylon 6T or nylon 9T representative of copolymer polyamide fiber composed of aliphatic amine and aromatic carboxylic acid, polyester fiber obtained from polyethylene terephthalate, polytrimethylene terephthalate, polybutylene terephthalate, polyethylene naphthalate, etc. either singly or in a copolymer or mixture, para-phenylene terephthal amide or a copolymer of this and aromatic ethyl representative of aramid fiber, total aromatic polyester fiber, vinylon fiber, ultra high polymer polyethylene fiber, fluorocarbon fiber containing polytetrafluoroethylene, polysulfone fiber, polyphenylene sulfide fiber (PPS), polyethylethylketone fiber (PEEK), polyimide fiber, polyethylimide fiber, cellulose fiber containing high-strength rayon, acrylic fiber, carbon fiber, glass fiber, silicon carbide (SiC) fiber or alumina fiber representative of ceramic fiber. As may be required, the fiber may contain inorganic fiber such as steel representative of metal fiber.

Also, any additives which are normally used may be used in the fiber in order to improve spinning and processability as well as the durability of material, for example, heat resistance agent, antioxidant, light resistance agent, anti-aging agent, lubricant, lubricating agent, pigment, water repellent agent, oil repellent agent, masking agent such as titanium oxide, brightening agent, flame retardant, or plasticizer. These may be used either singly or in a combination of two or more. Also, as needed, processing including twisting, bulking, crimping, or wrapping may be performed. Further, the type of fiber may, for example, be a long-fiber filament, short-fiber spun yarn, or a composite of these. However, the type is not limited in particular.

Also, a loom used for making the cloth can be appropriately selected from any loom used for weaving normal industrial-use cloth, for example, shuttle loom, water-jet loom (WJL), air-jet loom (AJL), rapier loom, or projectile loom. A texture of the cloth can also employ plain weave, basket weave, twill weave, or ripstop weave, either singly or in combination as a composite texture.

Also, any joining method (sewing, bonding, melting) which is normally used in manufacture of airbags can be used for joining at locations other than where hardening adhesive is applied, that is, for joining by outer periphery joining portion 15 of outer periphery 14 of airbag 1, and attaching-member joining portion 27 of gas inlet opening 21. In an instance of sewing, sewing specifications can be appropriately selected according to any conventional sewing conditions, for example, comparatively thick thread of from 0 count to 20 count may be used, sewing in a range of from 3 to 6 stitches/cm. Stitching specifications can be appropriately selected from lock stitch, double chain stitch, interlock stitch, safety stitch, over-edge chain stitch, or other types of stitching. The number of stitching lines can be from 1 to 3 lines, and a distance between stitching lines can be from 2 to 6 cm. Also, as needed, sealant such as silicone resin or rubber cement may be used on the stitched portion in order to control tearing of stitching, especially at outer circumference portion of the airbag. That is, after sealants have been applied between the materials to be joined, the materials are sewn together, after which sealant is applied to the top of the stitches along the seam.

Also, sewing thread used for joining by outer periphery joining portion 15, attaching-member joining portion 27, and other locations can be selected from thread known as synthetic filament yarn, or industrial-use sewing thread, for example, nylon 6, nylon 6,6, nylon 4,6, polyester, vinylon, aramid, carbon, glass, as well as spun yarn, filament plied yarn, filament resin treated thread.

Also, reinforcing cloth 25, 55 used for reinforcing airbag 1 may be the same cloth used for the main base cloth which constitutes the airbag body, otherwise, prepared reinforcing cloth may be used, for example, cloth which is thicker than cloth made from 470 to 940 decitex of nylon 6,6 as used in airbag 1. Such cloth may be used either singly or in several layers.

Also, in an instance of joining several reinforcing cloths by bonding, prepared cloth constituted by several other previously joined cloths may be bonded. For example, such cloth may be constituted of several reinforcing cloths which have been previously sewn together and laminated, reinforcing cloths previously bonded together and laminated, several base cloths previously melted together, cut, and laminated, or several base cloths previously temporarily melted together by oscillation or other method, cut, and laminated. The reinforcing cloth is meant to be a flame repellent to block hot gas which is injected from inflator 4, and is also meant to be a cloth directly covering inflator 4, and in order to provide a heat-resistance characteristic to reinforcing cloth, heat-resistant resin such as silicone resin or fluorocarbon resin, or heat-resistant rubber may be applied, and an amount applied may be more than that of the main base cloth of airbag 1. Also, cloth using heat-resistant fiber such as aramid fiber may be used.

Further, also in an instance of bonding the main base cloth and the reinforcing cloth, in order to ensure that the main base cloth and the reinforcing cloth are firmly held together as well as increase the pressure resistibility and sturdiness of airbag 1, it is preferable to sew the main base cloth and the reinforcing cloth together at an inner edge portion of gas inlet opening 21 which is an inflator attachment opening. In this instance, it is preferable that sewing together of this part be performed as part of final processing after outer periphery portion has been sewn. The head of a sewing machine can be entered through gas inlet opening 21 to sew the inner edge portion thereof, and the type of machine can be appropriately chosen, for example, cylinder-type machine (lock stitch, interlock stitch), post-type machine (lock stitch, double chain stitch), or arm-type machine (lock stitch, interlock stitch) may be used.

Also, the main base cloth of airbag 1 is not limited to being constituted from two base cloths. The main base cloth may be a single piece of cloth formed by second base cloth portion 12 continuing integrally from first base cloth portion 11. Also, first base cloth portion 11 and second base cloth portion 12 may each be formed from several joined-together pieces of base cloth.

Figure 12:
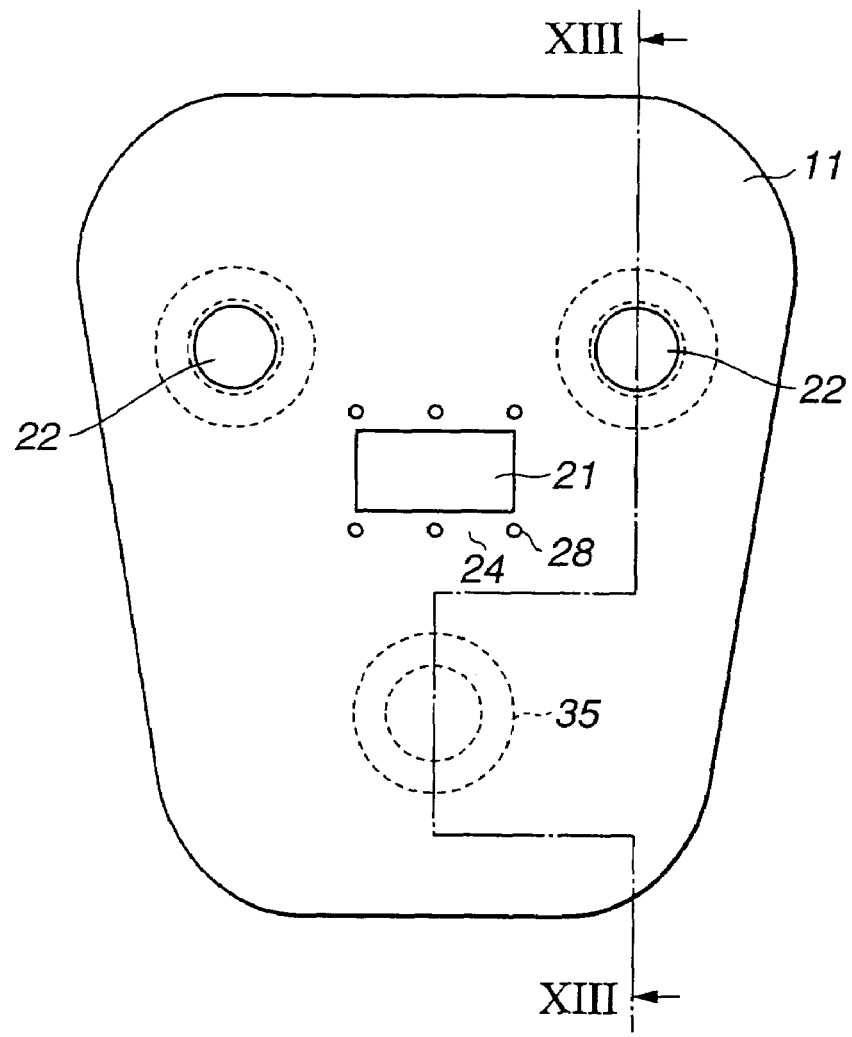
FIG. 12 is a bottom view of a still further modification of the airbag according to the present invention.
Figure 13:
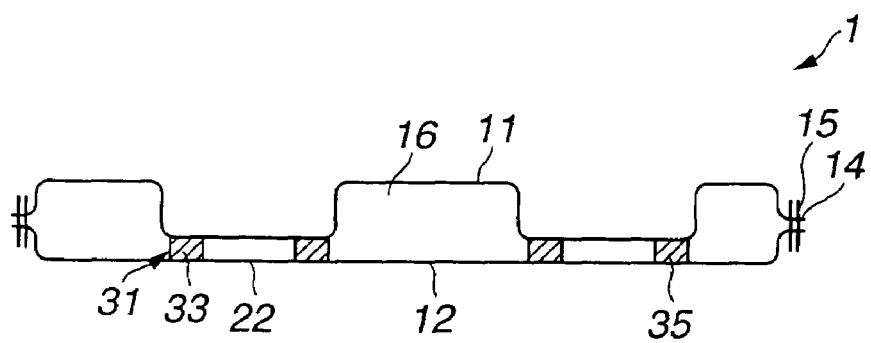
FIG. 13 is a cross-sectional diagram of the airbag of FIG. 12 showing a side view taken along the line XIII—XIII.

Also, airbag 1 is intended for protecting all passengers in a vehicle, and other than airbag 1 which is disk-shaped and installed in a steering wheel for use in the driver's seat, airbag 1 is also applicable as a passenger seat as shown in FIGS. 12 and 13, or as a side collision airbag (side bag, curtain bag). Further, it is possible to apply the present invention as needed to any place where the present invention could be functionally adapted, for example, knee airbag, foot airbag, rear-seat airbag, rear collision headrest airbag, infant mini-airbag, pedestrian airbag, or seatbelt airbag (airbelt). The shape and volume can be adapted to satisfy desired requirements. Further, other applications of the present invention are possible, for example, in vehicles other than a bicycle or an automobile (train, airplane, ship), or for pedestrians.

Figure 14:
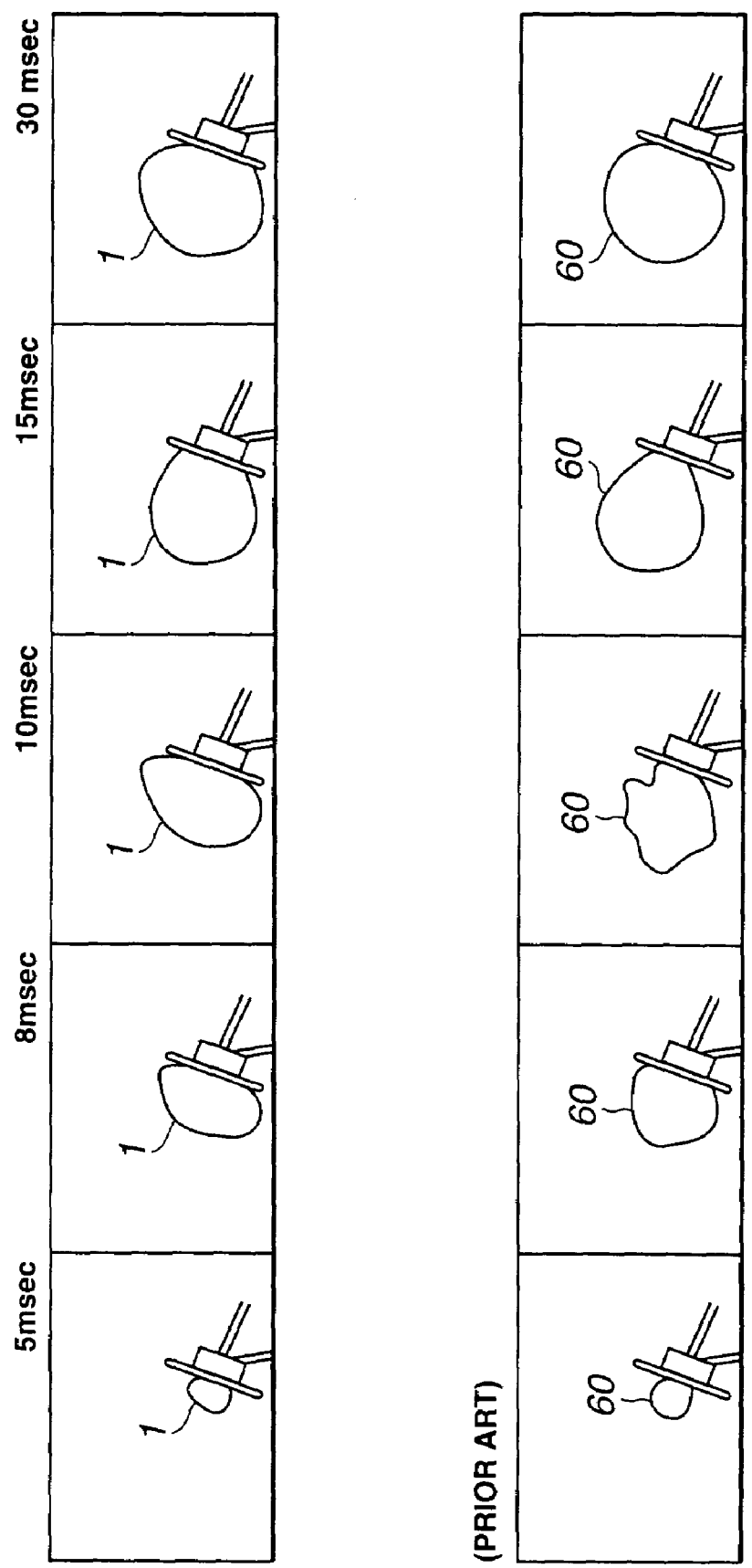
FIG. 14 is two sequences of views showing an inflation shape of the embodiment according to the present invention and an airbag according to the related art in comparison.
Figure 15:
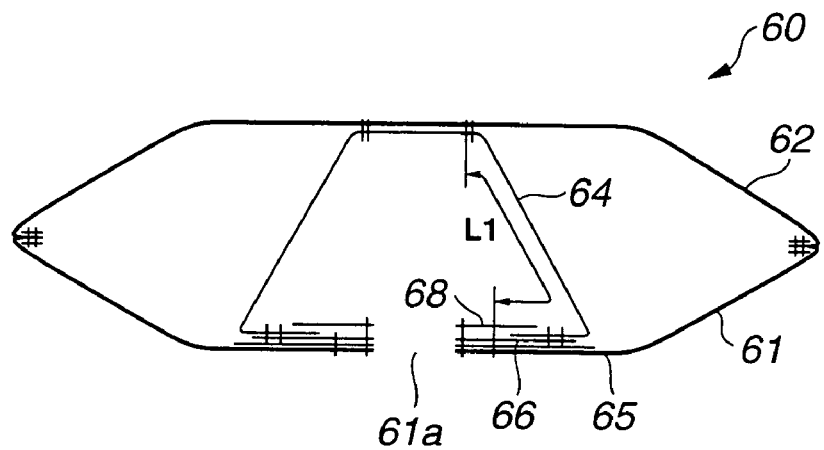
FIG. 15 is a sectional view showing an airbag according to the related art shown in FIG. 14.
Figure 16:
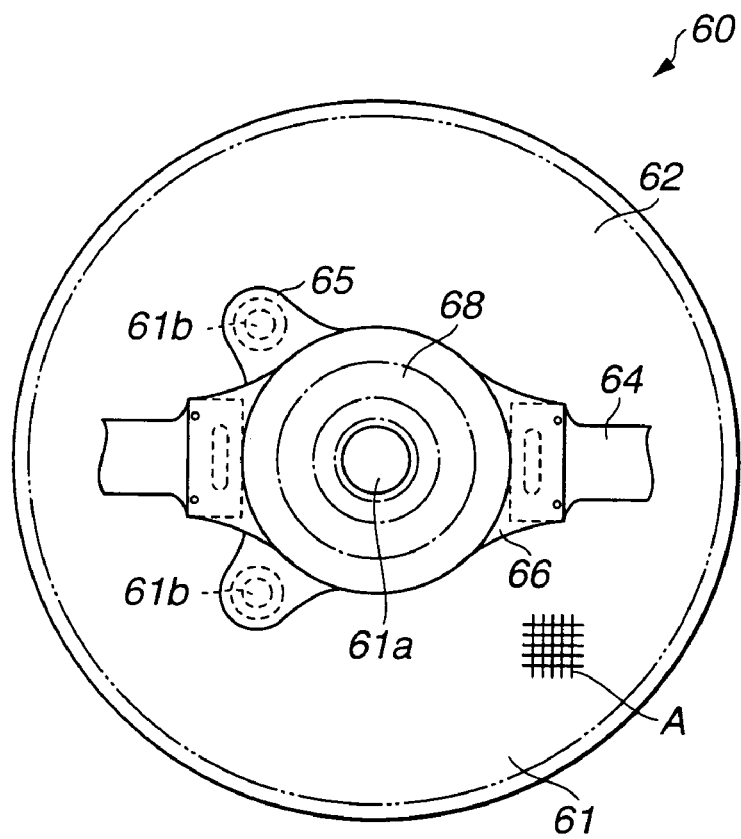
FIG. 16 is a top view showing a portion of an airbag according to the related art shown in FIG. 15.

Next, the results of a comparison between the example according to the present invention and a comparative example of the prior art are shown with reference to table 1, and FIGS. 14 through 16.

Characteristics of airbag 1 were evaluated in the following manner.

1) Inflation Test

Airbag 1 (EXAMPLE I) in a compactly folded state and inflator 4 (Daicel ZA, dual-type, maximum pressure 200 kpa) were fixed to a module, and the entire module pre-heated to 100° C. After pre-heating, airbag 1 was inflated as though it would inflate in a collision. A maximum internal pressure of airbag 1 was measured, and a state of initial projection (i.e., a height of airbag 1 at 10 ms (milliseconds) after firing of inflator 4) was observed from a sequence of images showing inflation of airbag 1 taken with a high-speed camera. The maximum internal pressure and inflation height of airbag 1 are assigned a relative value of 100 to facilitate comparison.

Table 1 shows relative maximum internal pressures and initial heights of airbag 1 and comparative examples. Also, FIG. 14 is a sequence of images taken with a high-speed camera of an inflation shape of the example according to the present invention and a comparative example of the prior art, and shows a state of each at 5 ms, 8 ms, 10 ms, 15 ms, and 30 ms after firing. Further, FIG. 15 is a cross-sectional view of the comparative example of the prior art. FIG. 16 is a plan view showing a bottom side of the comparative example of the prior art.

2) Hardness of Adhesive Agent

Measured by type A durometer according to JIS K6253 (Hardness testing methods for rubber, vulcanized or thermoplastic).

EXAMPLE I

A flat cloth is first made using nylon 6,6 fiber 350 dtex/72 f (filaments) (original thread strength 8.6 cN/dtex) thread, both lengthwise and breadthwise woven density being 23.6 (filaments/cm). The cloth is next scoured and heat-set to form a non-coated cloth. Both lengthwise and breadthwise woven density after heat-setting are 24.4 (filaments/cm), and weight is 190 g/m$^2$. Thermosetting silicone resin is next applied in 35 g/m$^2$ (weight of dry coating) to the cloth as flame repellent. The cloth is then dried at 120° C., and finally heat treated at 160° C. to form a coated base cloth.

From this coated cloth, as shown in FIG. 1, two circular pieces both having an outer diameter of 690 mm (first base cloth portion 11, second base cloth portion 12) are cut out for the main base cloth of airbag 1, three ring-shaped pieces each having an inner diameter of 66 mm and an outer diameter of 200 mm are cut out for reinforcing cloth 25 of gas inlet opening 21, and two ring-shaped pieces each having an inner diameter of 30 mm and an outer diameter of 60 mm are cut out for reinforcing cloth of gas escape venting 22, 22. Gas inlet opening 21 is formed with a diameter of 66 mm in a center of first base cloth portion 11, and gas escape venting 22, 22 is formed as two holes each having a diameter of 30 mm respectively on the left and right respectively of gas inlet opening 21 diagonally at substantially 45° angles in first base cloth portion 11, such that a first line joining a center of gas inlet opening 21 and a center of one hole of gas escape venting 22, 22, and a second line joining the center of gas inlet opening 21 and a center of the other hole of gas escape venting 22, 22, would form an angle of 90°. Also, at a periphery of gas inlet opening 21, attaching holes 28 having a diameter of 6 mm are formed in four locations so as to match the grain of the cloth. Three pieces of reinforcing cloth 25 of gas inlet opening 21 are layered in a center of first base cloth portion 11, and joined to first base cloth portion 11 by an attaching-member joining portion 27, which is formed by an upper thread and lower thread both of nylon 6,6, 8 count, sewn using lock stitch, 3.5 stitches/cm, in two lines with stitch diameters across gas inlet opening 21 of 75 mm and 170 mm. Next, adhesive agent (Dow Corning Toray Silicone, cold setting silicone adhesive CF9712) is applied as temporary bonding with a thickness of 0.1 mm using a spatulate in three places as shown in FIG. 1 on the coated side of first base cloth portion 11. Also, adhesive agent is applied at a periphery of each hole of gas escape venting 22, 22 in two circles, one following the shape of the reinforcing cloth (30 mm width ring shape), and the other at an outer region of the reinforcing cloth (approx. 40 mm width ring shape) so as to form a double-ring shape. Further, adhesive agent is applied in a circle at a position on a side of gas inlet opening 21 opposite to gas escape venting 22, 22 (referring to FIG. 1, the circle below gas inlet opening 21) in the same manner as at the outer region of the reinforcing cloth of gas escape venting 22, 22. Thus, the reinforcing cloth of gas escape venting 22, 22 and two reinforcing cloths 25 of gas inlet opening 21 are respectively disposed on each of the portions of first base cloth portion 11 where adhesive agent has been applied. Second base cloth portion 12 is next laid on top of first base cloth portion 11, light pressure is applied, after which joined first base cloth portion 11 and second base cloth portion 12 are left at room temperature for one day.

Following this, outer periphery 14 of first base cloth portion 11 and second base cloth portion 12 is sewn using nylon 6,6 sewing thread with upper thread 5 count, lower thread 8 count, double chain stitch, 4.0 stitches/cm, and seam allowance 20 mm, to form outer periphery joining portion 15.

A high-temperature inflation test according to the previously mentioned evaluation method was then performed using airbag 1 made according these specifications in accordance with the example of the present invention. Results of the test show that internal pressure of airbag 1 is higher, and initial inflation height of airbag 1 is lower than airbags used as comparative examples.

COMPARATIVE EXAMPLE I

An airbag 60 having a tether, a common feature in the related art, and having the same internal diameter as the example according to the present invention was used as COMPARATIVE EXAMPLE I representative of the prior art.

Airbag 60 used as COMPARATIVE EXAMPLE I was prepared in the following manner. A first base cloth 61 and a second base cloth 62 were cut out from a coated cloth to constitute a main base cloth. A gas inlet opening 61a having a diameter of 66 mm is formed in a center of first base cloth 61 which serves as the back or vehicle-side base cloth, and two gas escape vents 61b and 61b each having a diameter of 30 mm are formed in first base cloth 61 on the right and left respectively of gas inlet opening 61a diagonally at substantially 45° in a similar manner to the example according to the present invention. Also, a tether 64 having a middle portion width of 170 mm, a length of 520 mm, and a width at both ends of 70 mm, a reinforcing cloth 65 for gas inlet opening 61a having an inner diameter of 66 mm, an outer diameter of 260 mm, which is an irregular-shaped disciform also having a reinforcing portion for gas escape vents 61b and 61b, and a tether fixing cloth 66 having a tether fixing portion extending from both ends thereof are cut out, and further, a flame resistant cloth 68 which is the same shape as disciform reinforcing cloth 65 of gas inlet opening 61a is cut out from the coated cloth. Next, tether 64 is sewn to a center of second base cloth 62, which is the front or passenger-side base cloth, using nylon 6,6, 5 count sewing thread (both upper and lower threads), 3 stitches/cm, lock stitch, in two lines. Next, reinforcing cloth 65 and tether fixing cloth 66 are placed in a layered manner around gas inlet opening 61a, and the respective peripheries of gas inlet opening 61a and gas escape vents 61b and 61b are sewn. Stitching diameters of gas inlet opening 61a across each gas escape vent 61b, 61b are 115 mm and 200 mm, and a diameter of stitching of gas escape vents 61b and 61b are 50 mm and 55 mm. Sewing was performed with both upper and lower threads being nylon 6,6, 5 count, using lock stitch, 3 stitches/cm. Flame repellent 68 is next laid on top, and is sewn with the same sewing specifications with an innermost stitch diameter of 75 mm. Following this, second base cloth 62 is laid on top of first base cloth 61 in a layered fashion, and an outer periphery of airbag 60 is sewn using nylon 6,6, upper thread 5 count, lower thread 8 count, double chain stitch, in 2 lines, 3.5 stitches/cm, with a seam allowance of 20 mm. Next, both ends of tether 64 are laid on top of the tether fixing portion of tether fixing cloth 66, and are sewn using nylon 6,6, 5 count for both upper thread and lower thread, lock stitch, 4 stitches/cm. A length L1 of tether 64 between first base cloth 61 and second base cloth 62 is 220 mm.

Next, airbag 60, is turned inside-out through gas inlet opening 61*a*, and following the evaluation method, a high-temperature inflation test was performed using airbag 60 as COMPARATIVE EXAMPLE I. Results of the test show that internal pressure is lower than that of the example according to the present invention, and initial inflation height is comparatively higher than that of the example according to the present invention.

COMPARATIVE EXAMPLE II

In COMPARATIVE EXAMPLE II, other than using non-coated cloth for the main base cloth, and polyamide type hot-melt adhesive (Diamide 6.66.612, Daicel-Heuls) for adhesive agent, the airbag used for COMPARATIVE EXAMPLE II is made the same as the example according to the present invention. Evaluation results of the test show that internal pressure is lower than with the example according to the present invention, and also that initial inflation height is higher than with the example according to the present invention.

TABLE 1

|  | adhesive around gas escape venting | adhesive hardness (JIS-A) | maximum internal pressure* | initial inflation height* |
|---|---|---|---|---|
| EXAMPLE I | hardening silicone | 12 | 100 | 100 |
| COMPARATIVE EXAMPLE I | not used | — | 91 | 135 |
| COMPARATIVE EXAMPLE II | polyamide hot-melt | 78 | 75 | 112 |

*scaled to be relative values

As demonstrated by the results of the test, gas supplied from inflator 4 for expanding airbag 1 is used effectively, and projection distance during initial inflation is repressed.

Since both effective use of gas and regulation of inflation characteristics are enabled due to shielding connection portion 33, 33 formed from an adhesive agent, airbag 1 can be simply manufactured, and therefore reduce costs. Also, shielding connection portion 33, 33 peels to allow first base cloth portion 11 and second base cloth portion 12 to separate during the final stage of inflation, so that airbag 1 inflates to a maximum volume, and gas rapidly evacuates chamber 16 through gas escape venting 22, 22.

By forming shielding connection portion 33, 33 with pointed corner portion 41 facing gas inlet opening 21, tearing or peeling of shielding connection portion 33, 33 is easily prevented during the initial thrust of gas into airbag 1.

By forming shielding connection portion 33, 33 to be open toward outer periphery 14 of airbag 1, gas escape venting 22, 22 is shielded only in the direction of gas inlet opening 21 and communicates partially with chamber 16, allowing peeling of shielding connection portion 33, 33 to occur smoothly so that inflation characteristics are easily regulated, and therefore allowing airbag 1 to be smoothly inflated to outer periphery 14 thereof.

By forming shielding connection portion 33, 33 completely around gas inlet opening 21, gas is used effectively during the initial inflation stage by temporarily preventing gas escape venting 22, 22 from communicating with chamber 16.

By forming a tear start portion 54, 54, for example, at a portion of shielding connection portion 33, 33 facing the outer periphery of airbag 1, tearing can easily be started from a desired position to regulate inflation characteristics. In this manner, since gas escape venting 22, 22 is open in the direction facing outer periphery 14, airbag 1 can be inflated all the way to outer periphery 14 thereof during the initial stage of separation.

By forming auxiliary connection portion 35 as a connection portion 31 to separably join first base cloth portion 11 and second base cloth portion 12 at a position substantially opposite to shielding connection portion 33, 33 centered around gas inlet opening 21, airbag 1 can inflate with a balanced symmetry. Auxiliary connection portion 35 is formable at the same time as shielding connection portion 33, 33 as a cost-cutting measure.

By forming shielding connection portion 33, 33 with a hardening adhesive agent, the durability thereof is improved. Also, by selecting an adhesive with a rating of 25 or lower on the JIS-A scale, shielding connection portion is formed with a relative softness to increase storability of airbag 1.

By forming first base cloth portion 11 and second base cloth portion 12 with thin thread of 350 decitex or less, and using cloth with a weight of 200 g/m$^2$ or less, airbag 1 is made lightweight to enable compact folding thereof. By using cloth with a specific cover factor, which expresses how finely and closely woven a cloth is, that is, with a cover factor of 800 or over, tearing in cloth at shielding connection portions is controlled.

This application is based on a prior Japanese Patent Application No. 2002-242723. The entire contents of Japanese Patent Application No. 2002-242723 with a filing date of Aug. 22, 2002 are hereby incorporated by reference.

Although the invention has been described above by reference to a certain embodiment of the invention and modifications thereof, the invention is not limited to the embodiment and modifications described above. Modifications and variations of the embodiment described above will occur to those skilled in the art in light of the above teachings. The scope of the invention is defined with reference to the following claims.

What is claimed is:

1. An airbag for a vehicle, the airbag having only two walls and comprising:
   a first base cloth portion forming a first wall and having a gas inlet opening;
   a second base cloth portion forming a second wall that is proximate to a passenger and being joined along an outer edge thereof to an outer edge of the first base cloth portion to form a chamber which is fillable with gas, said second base cloth portion having no gas inlet opening;
   a gas escape venting which is communicable with the chamber wherein the gas escape venting is not disposed in said second base cloth portion; and
   a shielding connection portion which separably joins the first base cloth portion and second base cloth portion, the shielding connection being formed at least around a portion of a periphery of the gas escape venting which is closest to the gas inlet opening.

2. An airbag for a vehicle, the airbag comprising:
   a first base cloth portion having a gas inlet opening;
   a second base cloth portion joined along an outer edge thereof to an outer edge of the first base cloth portion to form a chamber which is fillable with gas, said second base cloth portion having no gas inlet opening;
   a gas escape venting which is communicable with the chamber wherein the gas escape venting is not disposed in said second base cloth portion; and a shielding connection portion which separably joins the first base cloth portion and second base cloth portion, the shielding connection being formed at least at a portion of a periphery of the gas escape venting which is closest to the gas inlet opening, wherein the shielding connection portion comprises a corner portion and guide portions which extend from the corner portion, the corner portion and the guide portions being disposed between the gas escape venting and the gas inlet opening.

3. The airbag as claimed in claim 1, wherein the shielding connection portion is open in a direction of an outer periphery of the airbag, the gas escape venting communicating with the chamber.

4. An airbag for a vehicle, the airbag comprising:
a first base cloth portion having a gas inlet opening;
a second base cloth portion joined along an outer edge thereof to an outer edge of the first base cloth portion to form a chamber which is fillable with gas, said second base cloth portion having no gas inlet opening;
a gas escape venting which is communicable with the chamber wherein the gas escape venting is not disposed in said second base cloth portion; and
a shielding connection portion which separably joins the first base cloth portion and second base cloth portion, the shielding connection being formed at least at a portion of a periphery of the gas escape venting which is closest to the gas inlet opening,
wherein the shielding connection portion is formed to completely enclose the gas inlet opening.

5. The airbag as claimed in claim 3, wherein the shielding connection portion comprises a tear start portion, tearing occurring most easily at the tear start portion starting from the direction of the outer periphery of the airbag.

6. The airbag as claimed in claim 1, the airbag further comprising an auxiliary connection portion disposed on a side of the gas inlet opening at a position substantially opposite to the shielding connection portion, the first base cloth portion and the second base cloth portion being separably joined thereby.

7. An airbag for a vehicle, the airbag comprising:
a first base cloth portion having a gas inlet opening;
a second base cloth portion joined along an outer edge thereof to an outer edge of the first base cloth portion to form a chamber which is fillable with gas, said second base cloth portion having no gas inlet opening;
a gas escape venting which is communicable with the chamber wherein the gas escape venting is not disposed in said second base cloth portion; and
a shielding connection portion which separably joins the first base cloth portion and second base cloth portion, the shielding connection being formed at least at a portion of a periphery of the gas escape venting which is closest to the gas inlet opening,
wherein the shielding connection portion is formed with a hardening adhesive agent, the hardening adhesive agent having a rating of 25 or less according to the JIS-A scale after hardening, measured by a type A durometer according to ASTM D2240.

8. The airbag as claimed in claim 7, wherein the first base cloth portion and the second base cloth portion comprise a cloth which is made from thread of 350 decitex or less, has a weight of 200 g/m² or less, and has a cover factor CF of 800 or more, cover factor CF being expressed by the equation $$CF = \sqrt{Dw} \times Nw + \sqrt{Df} \times Nf$$

assuming Dw to be a thickness of breadthwise threads thereof (decitex), Df to be a thickness of lengthwise threads thereof (decitex), Nw to be a lengthwise woven density thereof (filaments/cm), and Nf to be a breadthwise woven density thereof (filaments/cm).

9. The airbag as claimed in claim 2, wherein each guide portion respectively comprises a tear start portion which is formed at an end thereof and faces an outer periphery of the airbag, tearing occurring most easily at each tear start portion.

10. The airbag as claimed in claim 6, wherein the gas escape venting comprises a plurality of holes, and the auxiliary connection portion is formed in a single location.

11. The airbag as claimed in claim 10, wherein the shielding connection portion comprises a plurality of rings, each ring being formed respectively around each hole of the gas escape venting.

12. The airbag as claimed in claim 11, wherein the gas escape venting comprises two holes, each ring of the shielding connection portion and the auxiliary connection portion being formed in a circular shape.

13. The airbag as claimed in claim 11, wherein the gas escape venting comprises two holes, each ring of the shielding connection portion and the auxiliary connection portion being formed in a quadrangular shape, a corner of each ring pointing toward the gas inlet opening.

14. The airbag as claimed in claim 5, wherein the auxiliary connection portion and the shielding connection portion are disposed in rotation symmetry.

15. The airbag as claimed in claim 14, wherein the auxiliary connection portion is formed in one location, and the gas escape venting comprises one hole.

16. The airbag as claimed in claim 14, wherein the auxiliary connection portion comprises two rings, the gas escape venting comprises two holes, and the shielding connection portion comprises two rings, one ring being formed around one of the two holes of the gas escape venting, the other ring being formed around the other of the two holes of the gas escape venting.

17. The airbag as claimed in claim 16, wherein each ring of the shielding connection portion and of the auxiliary connection portion is formed in a bent elliptical shape.

18. An airbag for a vehicle, the airbag having only two walls and comprising:
a first base cloth portion forming a first wall and having a gas inlet opening;
a second base cloth portion forming a second wall that is proximate to a passenger and being joined along an outer edge thereof to an outer edge of the first base cloth portion to form a chamber which is fillable with gas, said second base cloth portion having no gas inlet opening;
gas escape means which is communicable with the chamber wherein the gas escape means is not disposed in said second base cloth portion; and
joining means for adhesively joining the first base cloth portion and second base cloth portion and also for shielding at least a portion of the gas escape means in the direction of the gas inlet opening, the first base cloth portion and the second base cloth portion separating when pressure inside the chamber rises beyond a predetermined value.

19. An airbag for a vehicle, the airbag having only two walls and comprising:
a first cloth portion forming a first wall, the first cloth portion comprising a gas inlet opening and a gas escape venting, the venting comprising one or more holes communicable with the chamber;

a second cloth portion forming a second wall that is proximate to a passenger and being joined to the first cloth portion along an outer periphery thereof, a chamber which is fillable with gas being formed thereby wherein the gas escape venting is not disposed in said second base cloth portion; and a connection portion which joins the first cloth portion and the second cloth portion temporarily, the first cloth portion and second cloth portion separating during inflation, the adhesive connection portion comprising a first adhesive portion which is formed at least at a portion of a periphery of the gas escape venting which faces the gas inlet opening, and a second adhesive portion which is formed at a position substantially opposite the first adhesive portion centered around the gas.

* * * * *